C. O. BLAKE.
WIND MOTOR.
APPLICATION FILED NOV. 27, 1917.

1,277,181.

Patented Aug. 27, 1918.
2 SHEETS—SHEET 1.

INVENTOR
Charles O. Blake
BY
Henry Orth
ATTORNEY

C. O. BLAKE.
WIND MOTOR.
APPLICATION FILED NOV. 27, 1917.
1,277,181. Patented Aug. 27, 1918.
2 SHEETS—SHEET 2.
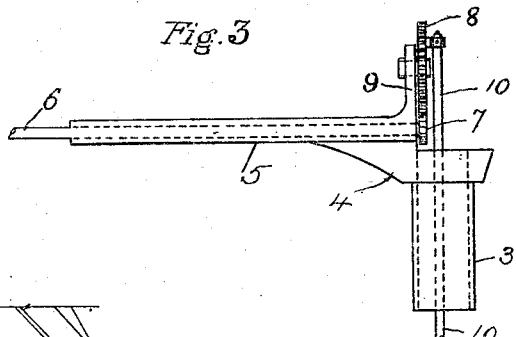
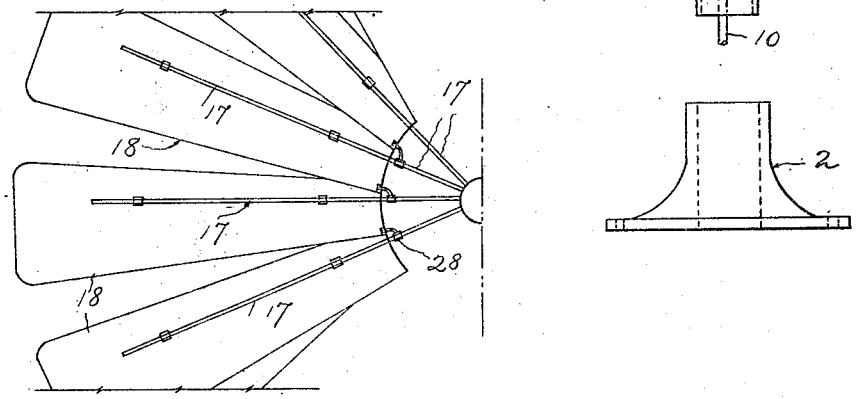
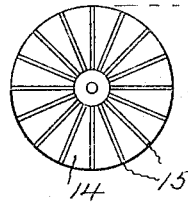
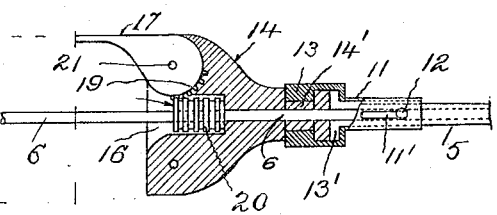
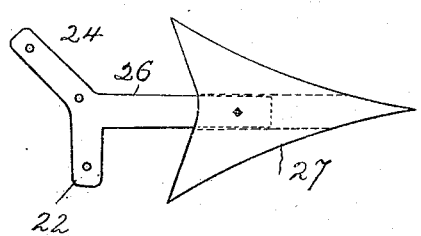
INVENTOR
Charles O. Blake
BY
Henry Orth Jr
ATTORNEY

UNITED STATES PATENT OFFICE.

CHARLES O. BLAKE, OF EL RENO, OKLAHOMA.

WIND-MOTOR.

1,277,181. Specification of Letters Patent. Patented Aug. 27, 1918.

Application filed November 27, 1917. Serial No. 204,216.

*To all whom it may concern:*

Be it known that I, CHARLES O. BLAKE, a citizen of the United States, and residing at El Reno, in the county of Canadian and State of Oklahoma, United States of America, have invented certain new and useful Improvements in Wind-Motors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in wind-motors.

In known motors the wind wheels are made to swing out of the wind when its force is sufficient to raise a counterweight, and being held to the wind by a vane do not change their position with sufficient readiness to avoid destruction from sudden squalls.

The object of my invention is to provide a wheel that will automatically adjust itself to the force of the wind and be adjusted in accordance with its load; will act as a vane and not only close when the load becomes too great, but will swing with the wind, being therefore practically indestructible by storms.

In the accompanying drawings—

Fig. 2 is a diagrammatic end view of a portion of the wheel showing the blades in open position.

Fig. 3 is an enlarged detail view of the parts forming the turn table.

Fig. 4 is an end view of the wheel hub with the blades removed therefrom.

Fig. 5 is a detail side view partly in section showing the hub and the blade operating mechanism.

Fig. 6 is an enlarged detail view of a counterweight.

Figure 1:
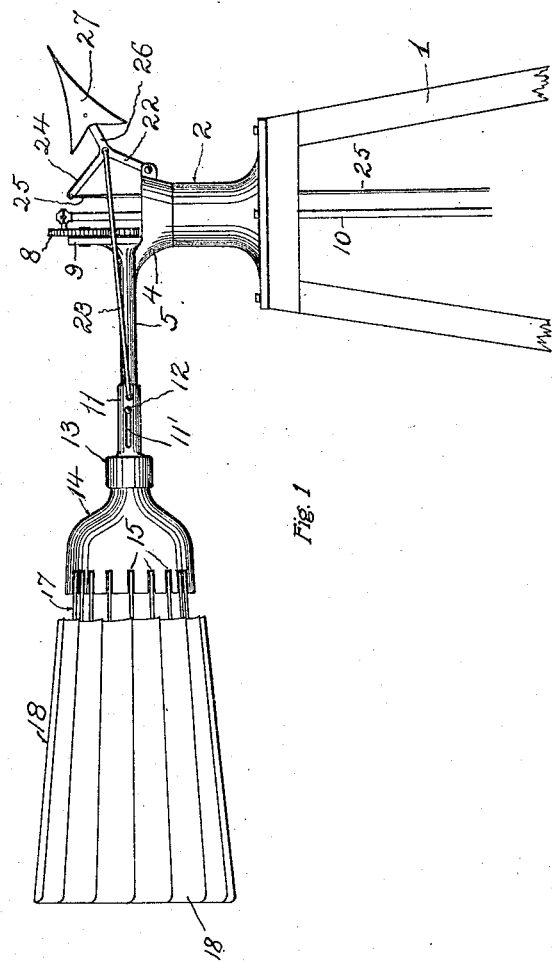
Figure 1 is a side view of a wind motor embodying my invention, the wheel being shown in closed position.

1 designates a tower of any suitable construction and on the top thereof is mounted a turn table which comprises a vertically arranged cylindrical socket or bearing member 2, having a suitable base designed to be bolted to the tower. Within the socket is rotatably mounted a cylindrical post 3, which is formed with a flanged head 4 bearing on the upper end of the socket.

The head 4 carries a horizontally arranged hollow spindle 5 in which is journaled a wheel shaft 6 and on the inner end of the shaft 6 is fixed a pinion 7, which meshes with a gear 8 journaled in a vertical standard 9 formed on and projecting upward from the head 4. The gear 8 carries a pitman 10 which extends down through the hollow post and socket to the base of the tower.

On the outer portion of the spindle 5 is slidably mounted a sleeve 11 which is held against rotation on the spindle and limited in its longitudinal movement thereon by means of a pin 12 on the spindle projecting through a longitudinal slot 11' formed in the sleeve. This sleeve has an enlarged coupling head 13, in which in journaled the hub 14 of the wheel.

The hub 14 is slidable, but not rotatable, on the shaft 6 and has a reduced end portion 14' which is T-shaped in cross section, as shown in Fig. 5, and said end portion is rotatably mounted in a similarly formed interior recess 13' of the coupling head.

The free end portion of the hub has a plurality of radial slots 15 which extend from an interior recess 16 of the hub to the periphery of the latter. In each radial slot 15 of the hub is pivotally mounted a rib 17 of the fan blades 18.

The pivoted end of each rib is formed with a segmental gear 19 arranged concentrically to the pivotal axis of the rib and these gears mesh with a cylindrical rack 20 fixed on the fan shaft 6, within the recess 16 of the hub.

It will be readily understood that, when the hub 14 is moved longitudinally of the shaft 6 and relatively to the cylindrical rack 20 the ribs 17 will swing on their pivots 21 by the engagement of the segmental gears 19 with rack 20.

The means here shown for shifting the hub comprises a triangular three-armed lever. One arm 22 of this lever is pivotally mounted at one end on the head 4, and is connected to the slide 11 by a connecting rod 23 (Fig. 1).

An arm 24 of said lever is connected to a rod 25 which extends within reach of an operator on the ground and by which the lever is actuated to slide the hub outward into the position shown in Fig. 1, whereby the ribs will swing into closed position. The third arm 26 of the lever, carries a counterweight 27 preferably in the form of a vane, which is adapted through its connection with the sleeve, to normally hold the hub nearer the socket 2 and in position for maintaining the blades in open position (as illustrated in Fig. 2) sufficiently to engage the wind to the extent necessary to furnish the power required. In order that the weight may be set in accordance with the load, or work to be done, said weight is adjustably mounted on the arm 26 as shown in Fig. 6.

To regulate the exposure of the blades to the wind, each rib has a sleeve 28 slidably mounted thereon and hinged to the inner end of the adjoining blade.

As shown in Fig. 5, the ribs 17 when folded will lie parallel to the axis of the wheel shaft 6 and the blades 18 will form a compact substantially cylindrical structure of approximately the same circumference as the periphery of the hub 14, as shown in Fig. 1. Therefore, when the wheel is closed and swinging with the wind, the blades are effectively shielded from the wind pressure by the hub, and owing to the tapering form of the latter, the pressure of the wind on these parts is so reduced that the structure is practically indestructible by storms; the wheel when closed acts as a vane to hold it with the wind.

I claim—

1. In a wind motor, the combination with a turn table, a horizontal bearing spindle carried thereby, and a wheel shaft journaled in the spindle, of a wheel hub having a closed tapering front end rotatable with the shaft, a sleeve slidable on the spindle connected with and inclosing the tapering end of the hub, a plurality of blade ribs pivoted in the large end of the hub, blades mounted on the ribs arranged to form when the wheel is closed, a cylindrical structure concentric to the axis of the shaft and closed at its front end by the hub, a cylindrical rack fixed on the shaft, segmental gears on the ribs concentric to their pivots engaging the rack, and means to shift the sleeve on the spindle to move the hub relatively to the rack to open and close the wheel.

2. In a wind motor, the combination with a turn-table, a horizontal bearing spindle carried thereby, and a wheel shaft journaled in the spindle, of a cylindrical rack fixed on the shaft, a closed wheel hub rotatable with the shaft and rack having an enlarged outer end portion surrounding the rack, a plurality of blade ribs pivoted in radial slots formed in said enlarged end portion, fan blades on the ribs arranged to overlap, when in closed position, and form a cylindrical structure of substantially the same circumference as the outer end of the hub, said hub operating to close the inner end of the cylindrical structure and being formed with a tapering inner end operating to reduce the wind pressure on the closed structure, segmental racks on the inner ends of the ribs engaging the cylindrical rack, a sleeve having a reduced inner end slidably mounted on the spindle, and formed with an enlarged outer end surrounding a flange on the inner end of the hub, a slot and pin connection between the sleeve and spindle, a counterbalancing lever pivoted on the turn table, a rod connecting the lever and sleeve whereby the hub is moved longitudinally of the cylindrical rack to swing the blades, and sliding connections between the blades and the adjoining ribs to limit the spread of the wheel.

In testimony that I claim the foregoing as my invention I have signed my name.

CHARLES O. BLAKE.

Copies of this patent may be obtained for five cents each, by addressing the "Commissioner of Patents, Washington, D. C."